United States Patent
Kawamura

(10) Patent No.: US 9,941,678 B2
(45) Date of Patent: Apr. 10, 2018

(54) ELECTRICAL CONNECTION BOX

(71) Applicant: YAZAKI CORPORATION, Tokyo (JP)

(72) Inventor: Yukihiro Kawamura, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/058,771

(22) Filed: Mar. 2, 2016

(65) Prior Publication Data

US 2016/0181777 A1 Jun. 23, 2016

Related U.S. Application Data

(63) Continuation of application No. PCT/JP2014/072985, filed on Sep. 2, 2014.

(30) Foreign Application Priority Data

Sep. 6, 2013 (JP) ................................. 2013-184984

(51) Int. Cl.
*H02G 3/08* (2006.01)
*B60R 16/023* (2006.01)
*H02G 3/16* (2006.01)

(52) U.S. Cl.
CPC ......... *H02G 3/086* (2013.01); *B60R 16/0238* (2013.01); *H02G 3/081* (2013.01); *H02G 3/16* (2013.01)

(58) Field of Classification Search
CPC ..... H02G 3/086; H02G 3/081; B60R 16/0238
See application file for complete search history.

(56) References Cited

U.S. PATENT DOCUMENTS

| 5,543,581 | A | | 8/1996 | Kurata et al. | |
|---|---|---|---|---|---|
| 6,022,247 | A | * | 2/2000 | Akiyama | B60R 16/0238 439/701 |
| 6,672,883 | B2 | * | 1/2004 | Kasai | B60R 16/0238 439/74 |
| 6,780,026 | B2 | * | 8/2004 | Sato | H01R 9/226 439/76.2 |
| 7,025,624 | B2 | * | 4/2006 | Kiyota | H01R 13/641 439/489 |

(Continued)

FOREIGN PATENT DOCUMENTS

| JP | 07-154914 A | 6/1995 |
|---|---|---|
| JP | 2002-325336 A | 11/2002 |

(Continued)

OTHER PUBLICATIONS

International Search Report for PCT/JP2014/072985 dated Nov. 18, 2014 [PCT/ISA/210].

(Continued)

*Primary Examiner* — William H Mayo, III
*Assistant Examiner* — Hiram E Gonzalez
(74) *Attorney, Agent, or Firm* — Sughrue Mion, PLLC

(57) ABSTRACT

An electrical connection box includes a frame, and a plurality of blocks each provided with a relay and the like and installed in the frame. The block is placed in an upper side in the frame. At least a portion of the block is placed under the block in a manner overlapping with the block. The relay provided to the block is connected to an electrical wire. The electrical wire is drawn horizontally from the block.

9 Claims, 15 Drawing Sheets

(56) References Cited

U.S. PATENT DOCUMENTS

| | | | |
|---|---|---|---|
| 7,649,731 B2* | 1/2010 | Parrish | B60R 16/0238 174/254 |
| 7,837,480 B2* | 11/2010 | Akahori | B60R 16/0238 439/76.2 |
| 2007/0240894 A1* | 10/2007 | Sasaki | H02G 3/086 174/50 |
| 2010/0319951 A1 | 12/2010 | Nakayama et al. | |
| 2014/0335724 A1* | 11/2014 | Kaneko | H05K 7/026 439/527 |

FOREIGN PATENT DOCUMENTS

| | | | |
|---|---|---|---|
| JP | 2004-088946 A | 3/2004 | |
| JP | 2007-068274 A | 3/2007 | |
| JP | 2009-278800 A | 11/2009 | |
| JP | 2011-010373 A | 1/2011 | |
| JP | 2012105508 A | 5/2012 | |

OTHER PUBLICATIONS

Written Opinion for PCT/JP2014/072985 dated Nov. 18, 2014 [PCT/ISA/237].

Communication dated Apr. 4, 2017, from the Japanese Patent Office in counterpart application No. 2013-184984.

Communication dated Jun. 13, 2017, from the Japanese Patent Office in counterpart application No. 2013-184984.

Report of Reconsideration by Examiner before Appeal dated Sep. 5, 2017, issued by the Japanese Patent Office in counterpart application No. 2013-184984.

* cited by examiner

ELECTRICAL CONNECTION BOX

CROSS-REFERENCE TO RELATED APPLICATION

This application is a continuation application of International Application PCT/JP2014/072985, filed on Sep. 2, 2014, and designating the U.S., the entire contents of which are incorporated herein by reference.

BACKGROUND OF THE INVENTION

1. Field of the Invention

The present invention relates to an electrical connection box mounted on vehicles and mainly distributing power sources.

2. Description of the Related Art

Electrical connection boxes in various configurations are used on vehicles. FIG. 15 illustrates an exemplary configuration of such an electrical connection box. An electrical connection box 301 illustrated in FIG. 15 includes a frame 302, an upper cover 303 that covers an upper surface 302*a* of the frame 302, a lower cover 304 that covers a lower surface 302*b* of the frame 302, and a plurality of blocks 306 and 307 installed in the frame 302.

Each of the blocks 306 and 307 is provided with parts such as a relay, a fuse, bus bars 313*a* and 313*c*, and these parts are connected to electrical wires 309*a*, 309*b*, and 309*c*. The electrical wires 309*a*, 309*b*, and 309*c* are extended from the lower surfaces of the blocks 306 and 307 toward the direction of the lower cover 304.

Japanese Patent Application Laid-open No. 2007-068274 describes an electrical connection box having a similar configuration as that of the above-described electrical connection box 301. An electrical connection box (1) in Japanese Patent Application Laid-open No. 2007-068274 includes a box body (2) corresponding to the frame 302, an upper cover (6), a lower cover (5), and a plurality of blocks (3) installed in the box body (2).

In the above-described electrical connection box 301, a space S formed under the block 306 is used only for routing the electrical wires 309*a* and 309*b*. The electrical connection box 301 problematically has a space-inefficient configuration due to such a wide empty space.

It is possible to place another block in the space S formed under the block 306. In this case, however, merely placing another block requires a certain level of height dimension of the block 306, a routing space for the electrical wires 309*a* and 309*b*, a certain level of the height dimension of the other block, and a routing space for an electrical wire extended from the other block. Such a problem may be caused that the frame 302 cannot accommodate all the parts unless the height dimension of the frame 302 is increased.

SUMMARY OF THE INVENTION

To overcome such a disadvantage, it is an object of the present invention to provide a space-efficient size-reducible electrical connection box.

To achieve the above-described objective, an electrical connection box according to one aspect of the present invention includes a frame; and a plurality of blocks each provided with a part and installed in the frame, wherein a first block is placed in an upper side in the frame, and at least a portion of a second block is placed under the first block in a manner overlapping with the first block, and a part provided to the second block is connected to an electrical wire and the electrical wire is drawn horizontally from the lower portion side of the second block and the drawn electrical wire extends toward a direction in which the electrical wire has been drawn.

According to another aspect of the present invention, in the electrical connection box, it is desirable that the first block and the second block are installed in the frame in a state of being joined to each other, and with the joining, parts provided to respective blocks are electrically connected to each other.

According to still another aspect of the present invention, in the electrical connection box, it is desirable that the first block and the second block are horizontally joined to each other.

According to still another aspect of the present invention, in the electrical connection box, it is desirable that a part provided to the first block is connected to an electrical wire and the electrical wire is drawn downward from the first block, and the second block is placed such that the second block avoids the electrical wire drawn from the first block.

DETAILED DESCRIPTION OF THE PREFERRED EMBODIMENTS

Figure 1:
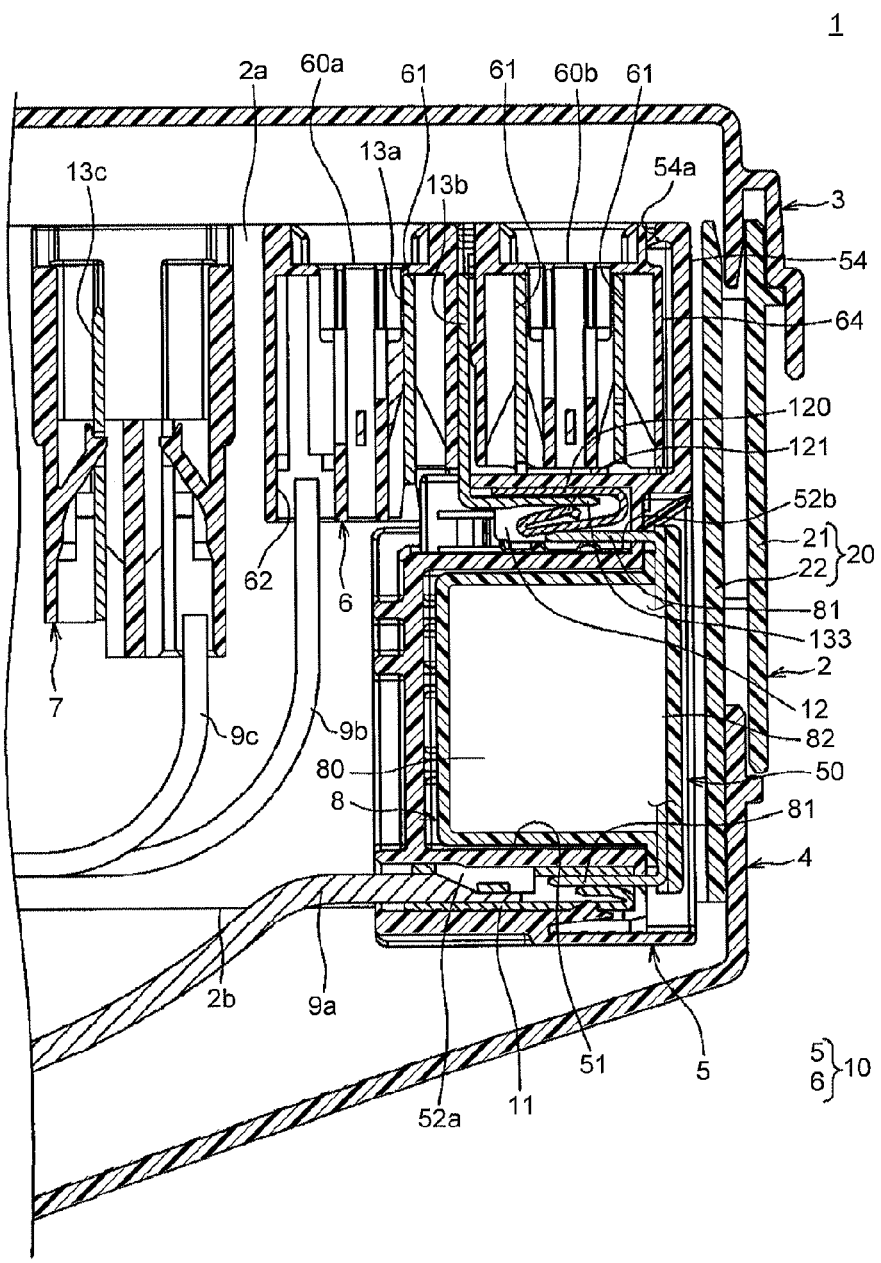
FIG. 1 is a cross-sectional view of an electrical connection box according to an embodiment of the present invention.

An "electrical connection box" according to an embodiment of the present invention will now be described with reference to FIGS. 1 to 14. An electrical connection box 1 illustrated in FIG. 1 is mounted on a vehicle and mainly distributes power sources. The electrical connection box 1 includes a frame 2, an upper cover 3 that covers an upper surface 2*a* of the frame 2, a lower cover 4 that covers a lower surface 2*b* of the frame 2, a plurality of blocks 5, 6, and 7 installed in the frame 2, a plurality of parts provided to each of the blocks 5, 6, and 7. The frame 2, the upper cover 3, the lower cover 4, the blocks 5, 6, and 7 are made from synthetic resin. The blocks 5, 6, and 7 are separately formed from one another. Various kinds of parts accommodated in a relay body 80 are not depicted in FIGS. 1 and 2.

The frame 2 has a peripheral wall 20 in the form of a frame. The peripheral wall 20 is configured as a double wall structure consisting of an outer wall 21 and inner wall 22.

The block 5 is provided with relays 8 and relay terminals 12. Each of the relay terminals 12 is electrically connected to a terminal 81 provided in one end of the relay 8. The terminal 81 provided in the other end of the relay 8 is electrically connected to a terminal 11 connected to an end of an electrical wire 9a. The electrical wire 9a is drawn horizontally from the block 5 toward the inside of the frame 2. The electrical wire 9a only has to be horizontally arranged inside the block 5 and in the peripheral area of the block 5 as illustrated in FIG. 1. The electrical wire 9a may hang downward in a portion away from the block 5. The downward direction corresponds to the direction of the lower cover 4 when viewed from the frame 2. The upward direction corresponds to the direction of the upper cover 3 when viewed from the frame 2.

The block 6 is provided with a plurality of fuses (not illustrated) and a plurality of bus bars 13a and 13b. A terminal in one end of each fuse is electrically connected to the bus bar 13a whereas the terminal in the other end of the fuse is electrically connected to an electrical wire 9b or the bus bar 13b. A terminal (not illustrated) is provided to an end of the electrical wire 9b. The electrical wire 9b is drawn from the lower surface of the block 6 toward the direction of the lower cover 4. The bus bars 13a and 13b will be described later.

The block 7 is provided with a plurality of fuses (not illustrated) and a bus bar 13c. A terminal in one end of each fuse is electrically connected to the bus bar 13c whereas the terminal in the other end is electrically connected to an electrical wire 9c. A terminal (not illustrated) is provided to an end of the electrical wire 9c. The electrical wire 9c is drawn from the lower surface of the block 7 toward the direction of the lower cover 4.

Figure 2:
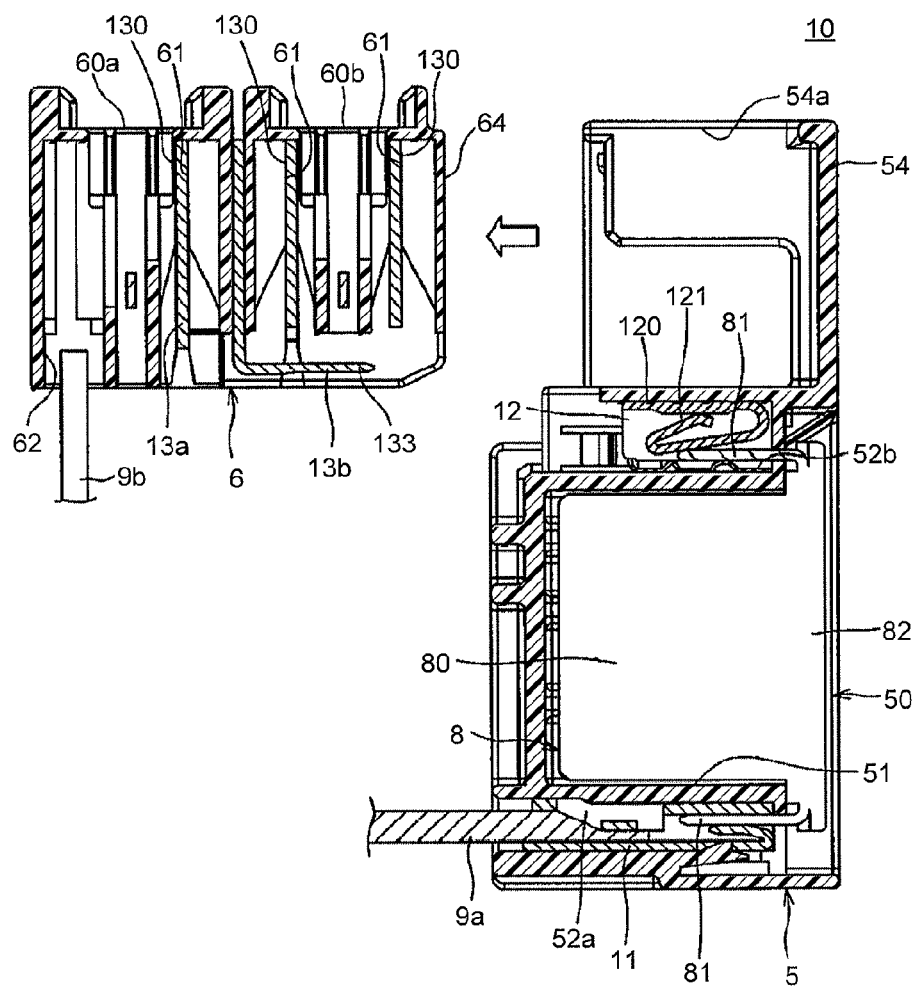
FIG. 2 is a cross-sectional view of a separated block assembly illustrated in FIG. 1.

The blocks 5 and 6 are aligned in the height direction along the peripheral wall 20 of the frame 2. Specifically, the block 6 is placed in the upper surface 2a side whereas the block 5 is placed in the lower surface 2b side. The block 7 is placed on the inner side of the frame 2 with respect to the blocks 5 and 6. As illustrated in FIG. 2, the blocks 5 and 6 are joined to each other to form a block assembly 10. The configuration of the block assembly 10 will now be described in details.

As illustrated in FIGS. 2 to 6, the block 6 forming the block assembly 10 includes a power source connecting unit 63 (FIG. 6), a plurality of fuse accommodating units 60a and 60b, bus bar accommodating grooves 61 that accommodate the bus bars 13a and 13b, a plurality of terminal accommodating units 62 that accommodate a terminal provided to an end of the electrical wire 9b (FIGS. 1 and 2), and a lock 66 (FIGS. 3 to 6) engaged with the frame 2.

The fuse accommodating units 60a accommodate fuses not electrically connected to the relays 8 in the block 5. Terminal accommodating units 62 are formed under the respective fuse accommodating units 60a in a manner corresponding to each other.

Figure 3:
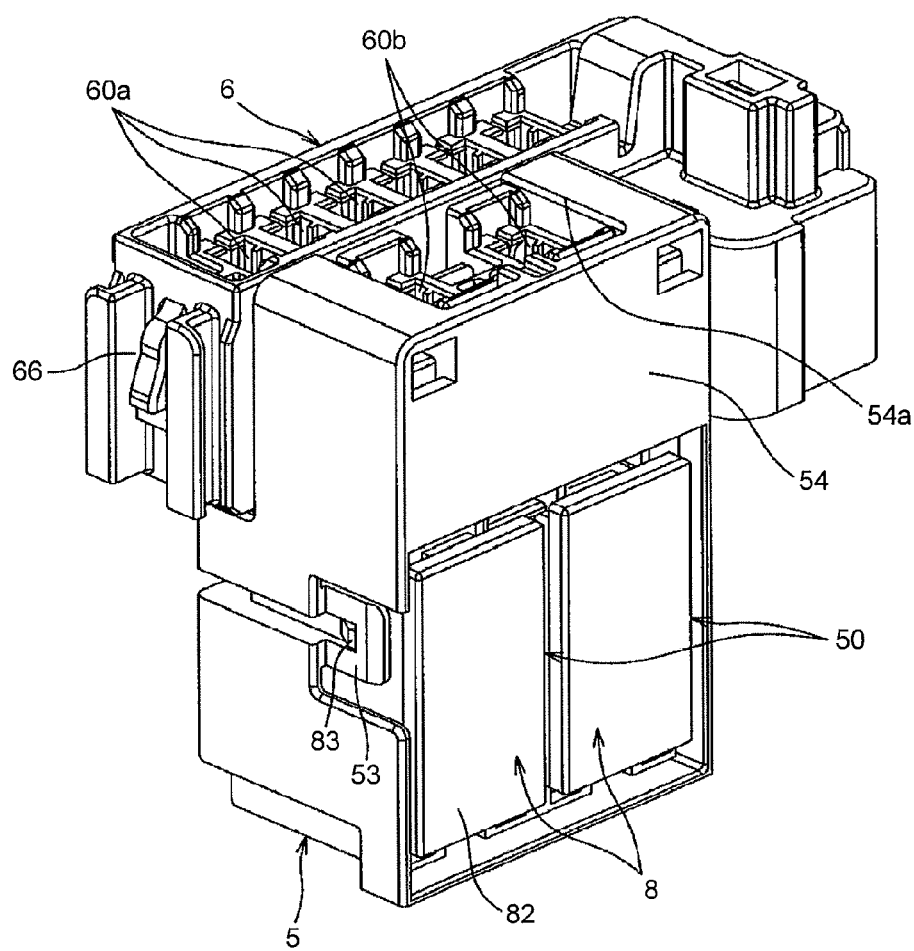
FIG. 3 is a perspective view of the block assembly illustrated in FIG. 1.
Figure 4:
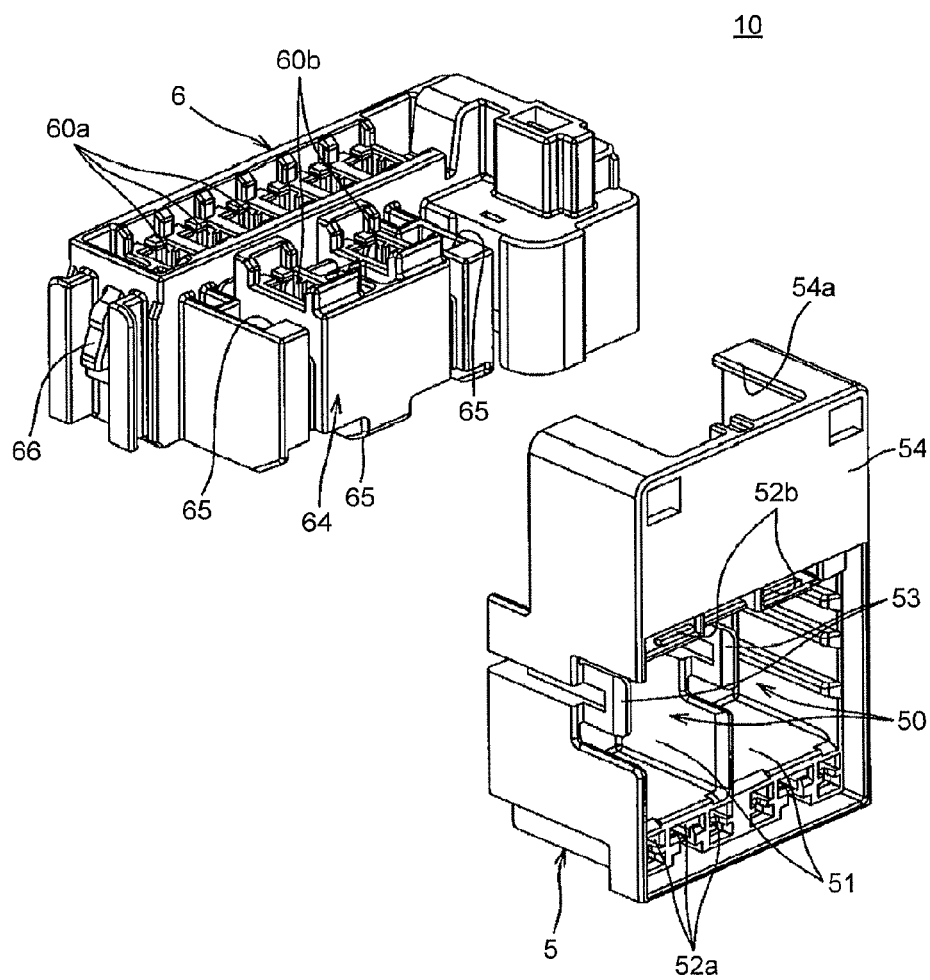
FIG. 4 is a perspective view of a separated block assembly illustrated in FIG. 3.
Figure 5:
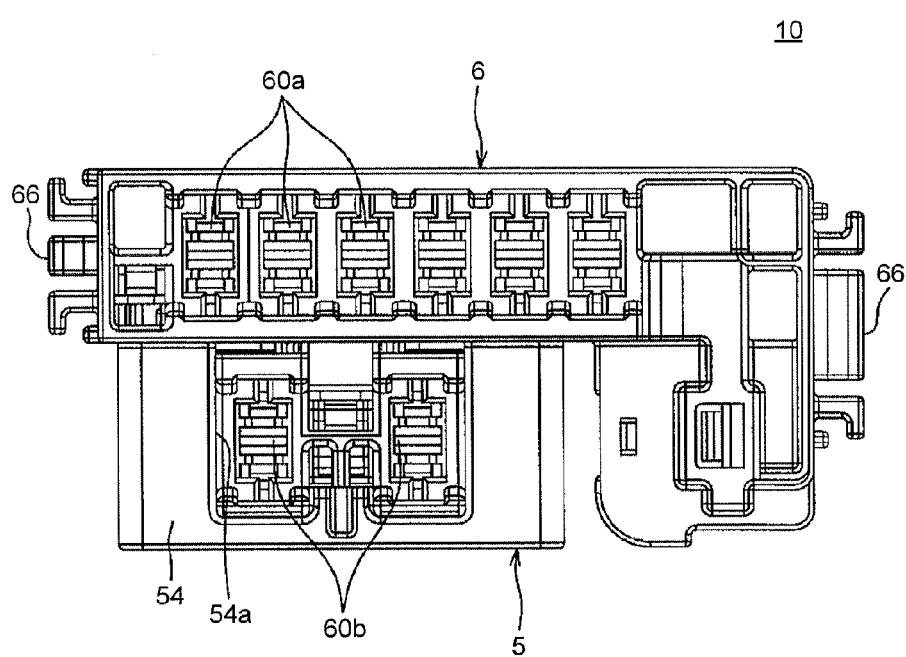
FIG. 5 is a plan view of the block assembly illustrated in FIG. 3.
Figure 6:
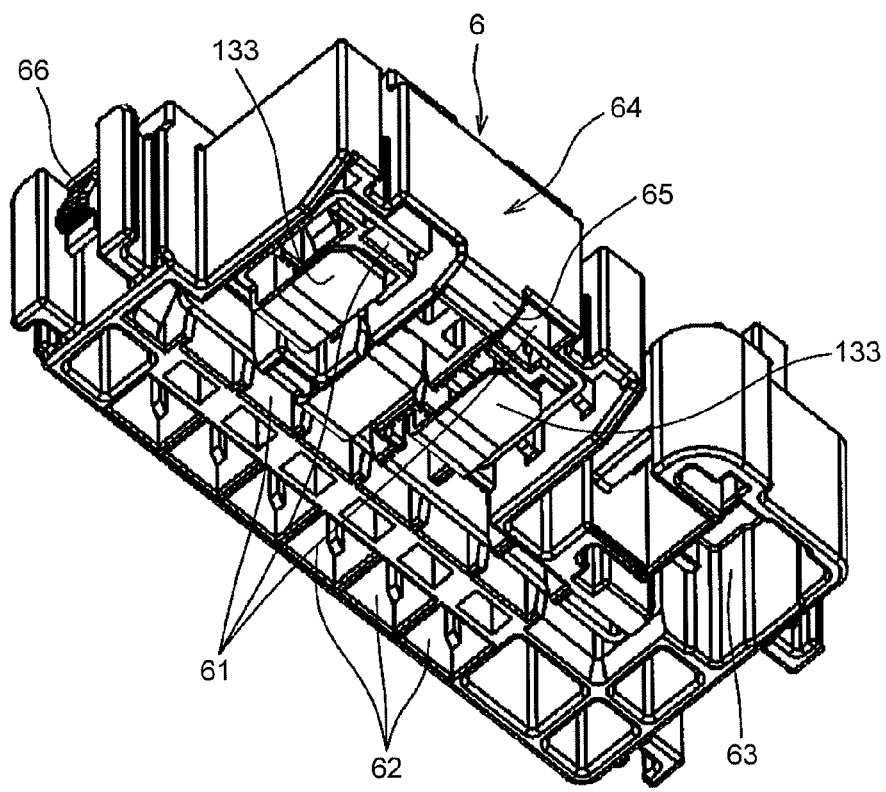
FIG. 6 is a perspective view that illustrates a bottom surface of a block illustrated in FIG. 4.

The fuse accommodating units 60b accommodate fuses electrically connected to the relays 8 in the block 5. The block 6 includes two fuse accommodating units 60b (FIGS. 3 to 5). The portion including the fuse accommodating units 60b in the block 6 is designed as a joined portion 64 joined to the block 5. Engaging units 65 (FIG. 4) engaged with the block 5 are formed on the joined portion 64.

Figure 11:
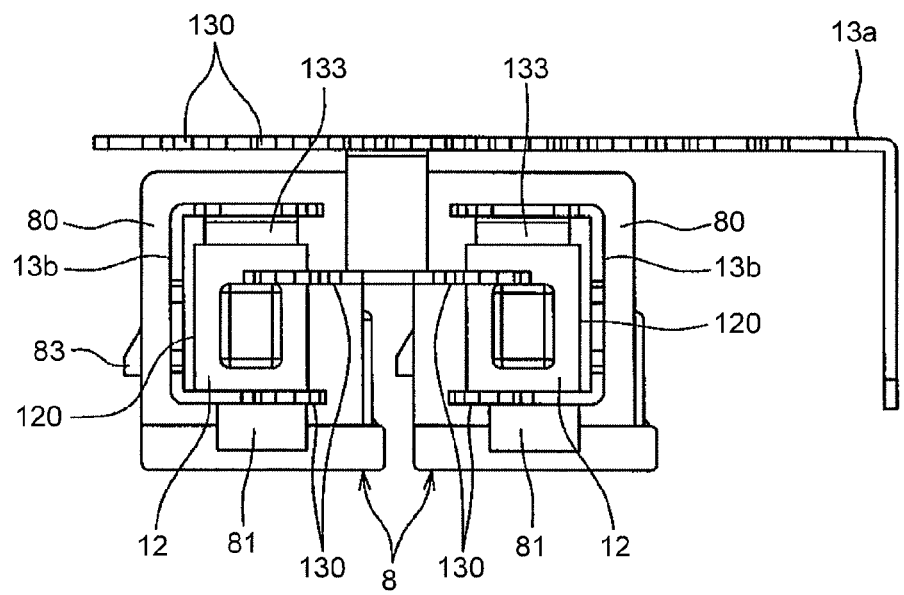
FIG. 11 is a diagram for describing parts provided to the block assembly illustrated in FIG. 3.
Figure 12:
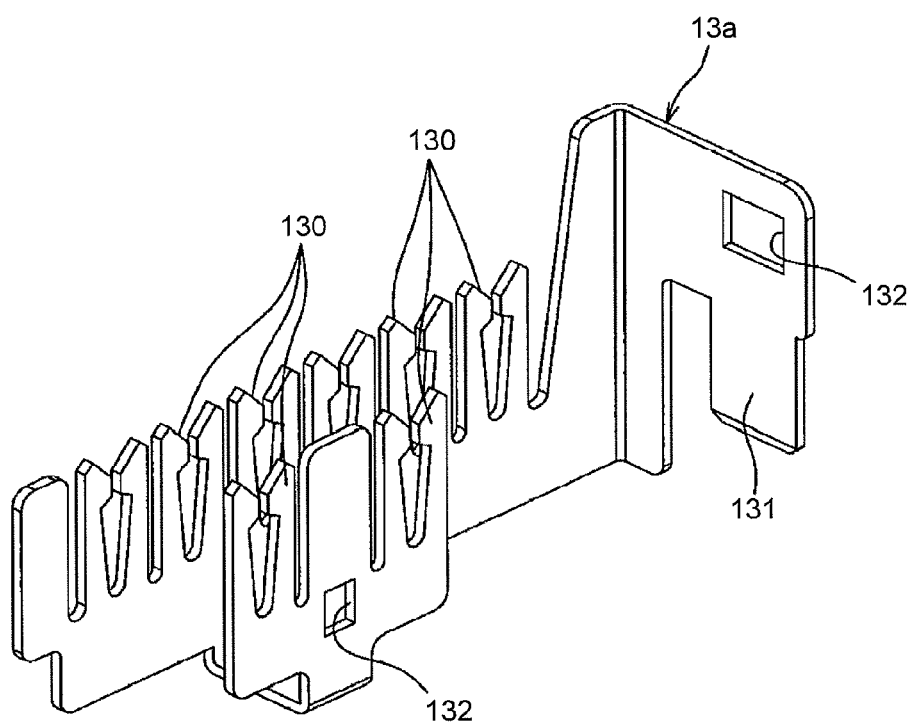
FIG. 12 is a perspective view of a first bus bar illustrated in FIG. 11.

As illustrated in FIGS. 11 and 12, the bus bar 13a includes an input portion 131 arranged on the power source connecting unit 63 and electrically connected to a power source wire (not illustrated), a plurality of fuse connecting portions 130 where terminals of fuses accommodated in the fuse accommodating units 60a and 60b are inserted, and retaining holes 132. The bus bar 13a is used for electrically connecting a power source wire led into the power source connecting unit 63 and fuses accommodated in the fuse accommodating units 60a and 60b. The bus bar 13a will be hereinafter referred to as a first bus bar 13a.

Figure 13:
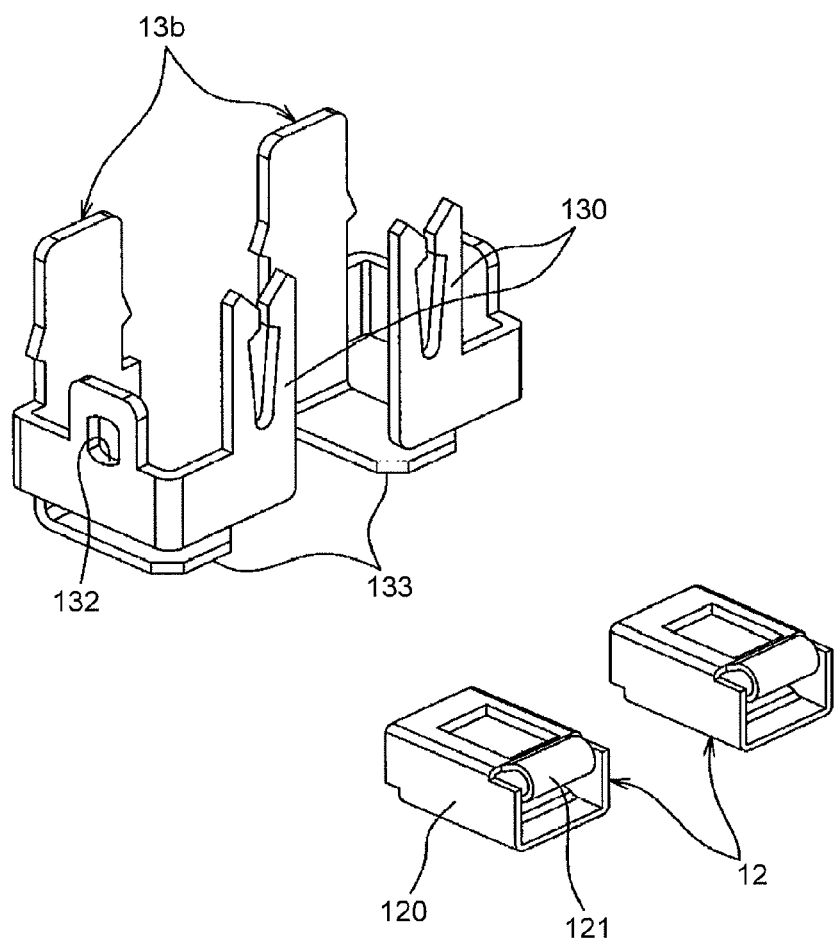
FIG. 13 is a perspective view of second bus bars and relay terminals illustrated in FIG. 11.
Figure 14:
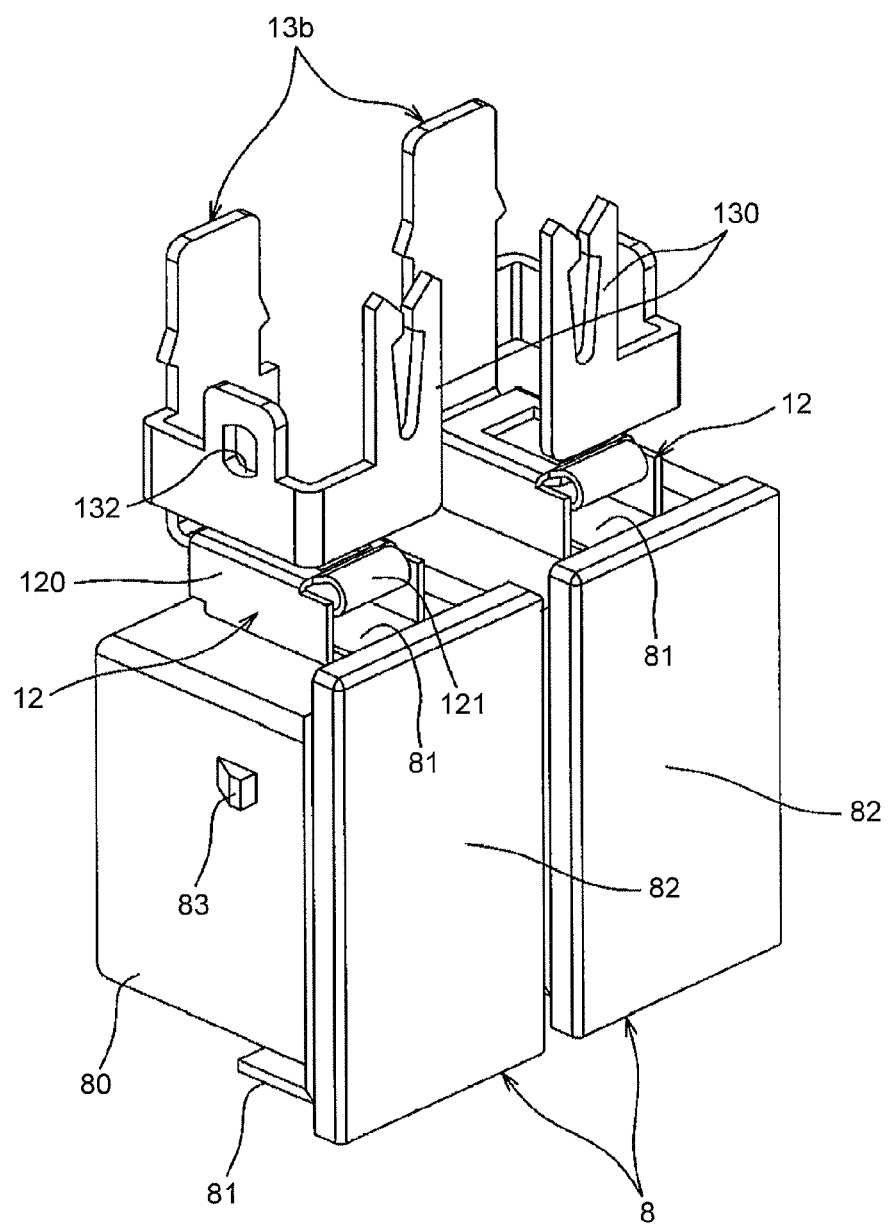
FIG. 14 is a diagram for describing a connection structure of the second bus bars, the relay terminals, and the relays illustrated in FIG. 11.
Figure 15:
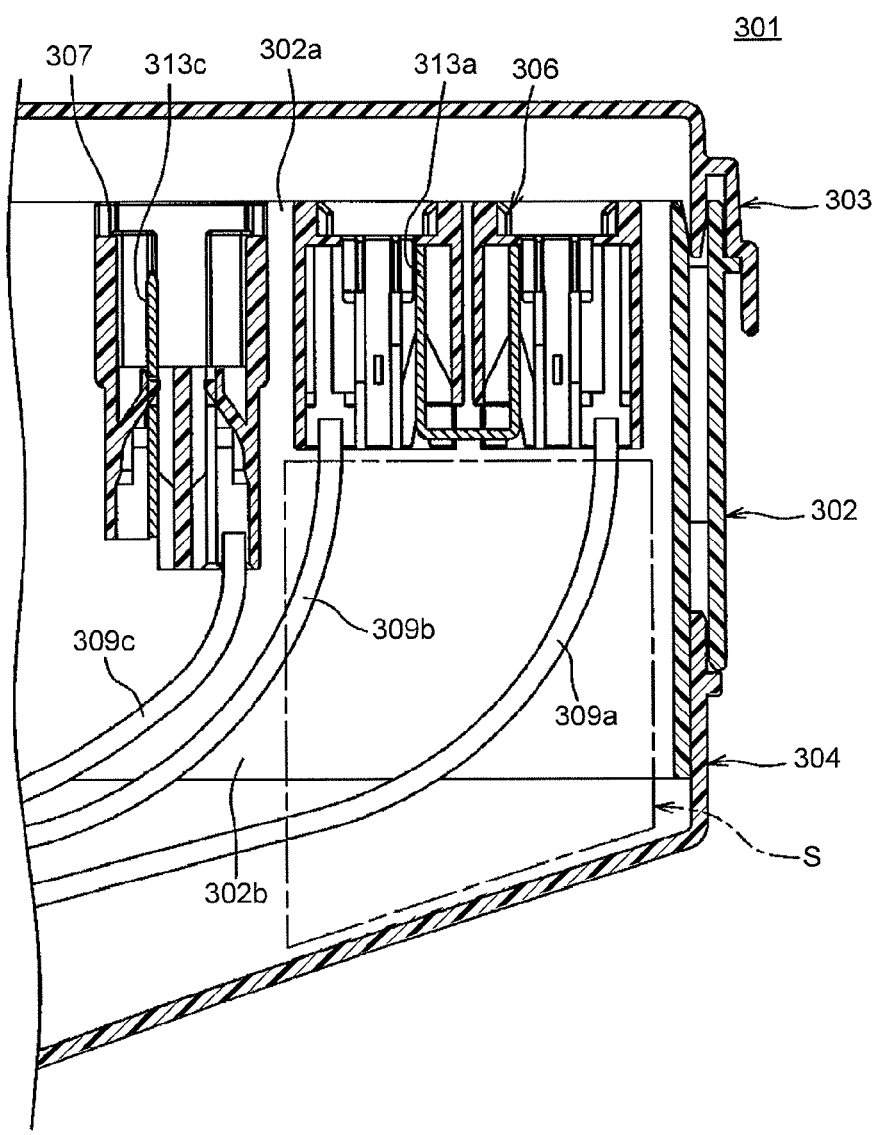
FIG. 15 is a cross-sectional view of a conventional electrical connection box.

As illustrated in FIGS. 11, 13, and 14, the bus bar 13b includes fuse connecting portions 130 where terminals of fuses accommodated in the fuse accommodating units 60b are inserted, relay connecting portions 133 electrically connected to the relays 8 in the block 5 through the relay terminals 12, and the retaining hole 132. The bus bar 13b is used for electrically connecting fuses accommodated in the fuse accommodating units 60b and the relays 8 in the block 5. The bus bar 13b will be hereinafter referred to as a second bus bar 13b. The block 6 includes two second bus bars 13b.

As illustrated in FIGS. 2 to 4, 7, and 8, the block 5 forming the block assembly 10 includes a joined portion 54 joined to the joined portion 64 of the block 6 and two relay accommodating units 50.

Figure 7:
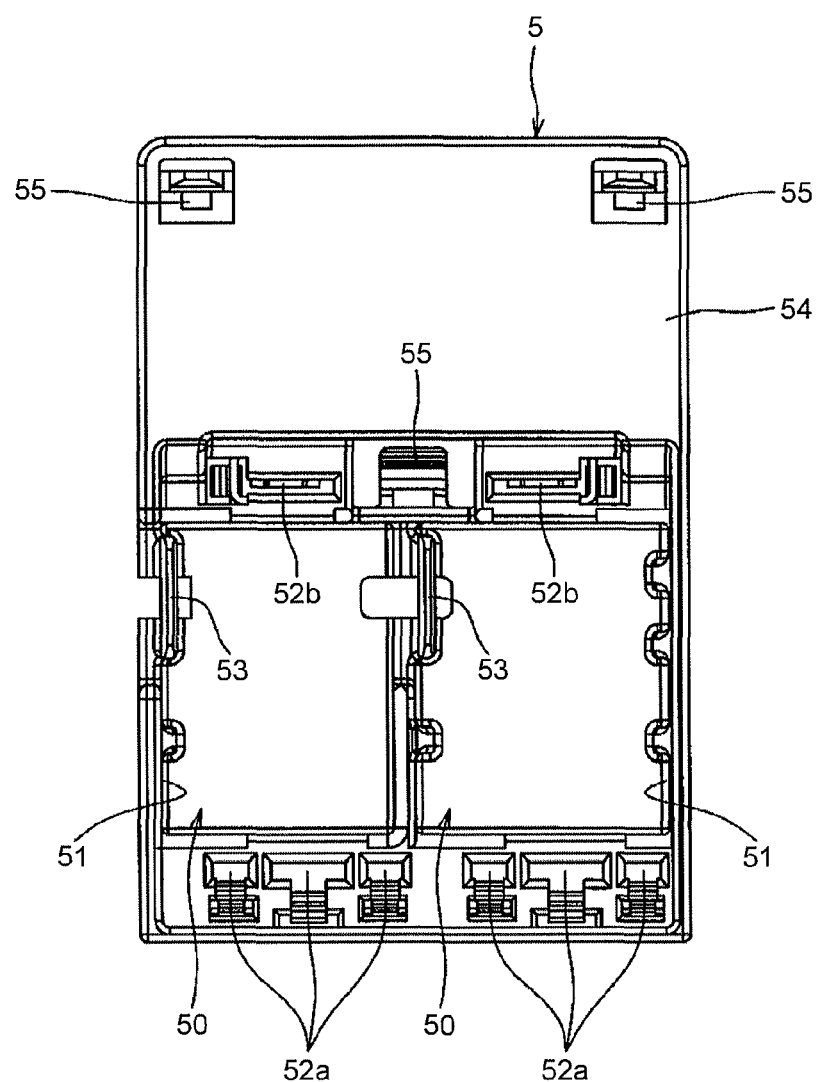
FIG. 7 is a lateral view that illustrates a lateral surface of the other block illustrated in FIG. 4.
Figure 8:
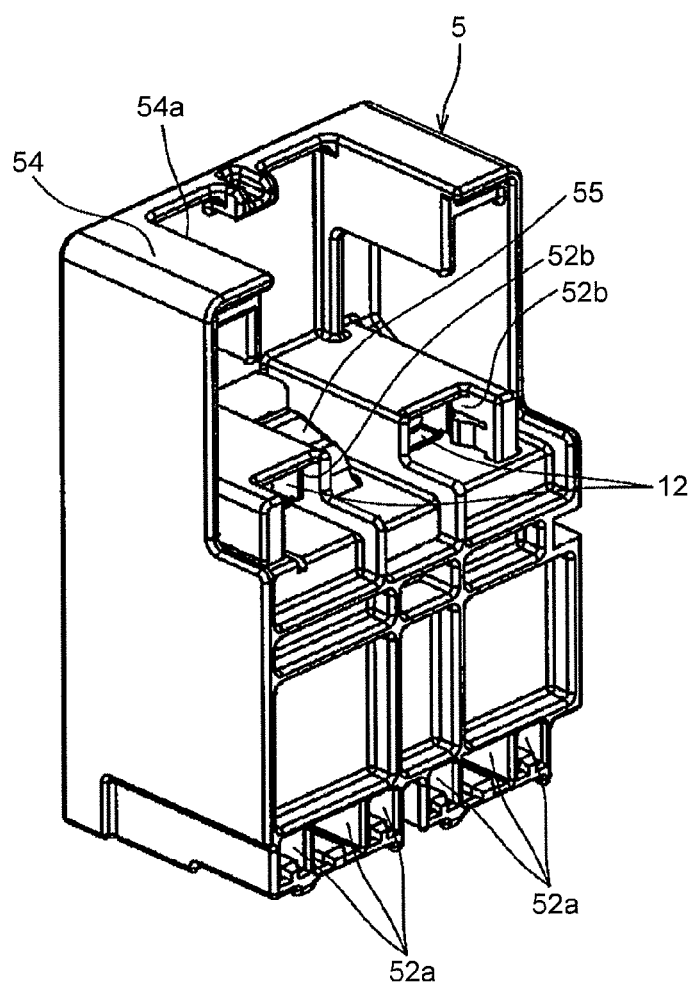
FIG. 8 is a perspective view that illustrates another lateral surface of the other block illustrated in FIG. 7.

The joined portion 54 is formed in a box shape so as to position the joined portion 64 of the block 6 inside the joined portion 54. As illustrated in FIG. 3, a cutout 54a for exposing the fuse accommodating units 60b is formed on the outer wall of the joined portion 54. As illustrated in FIGS. 7 and 8, engaging units 55 engaged with the engaging units 65 of the block 6 are formed inside the joined portion 54.

Figure 9:
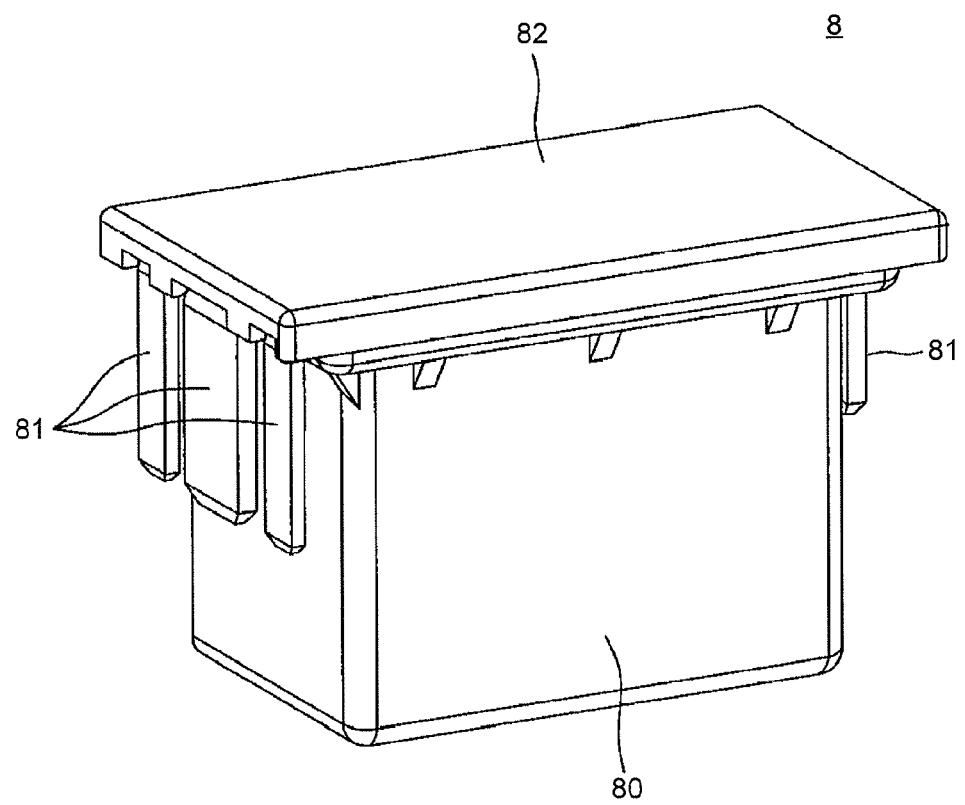
FIG. 9 is a perspective view of a relay illustrated in FIG. 1.
Figure 10:
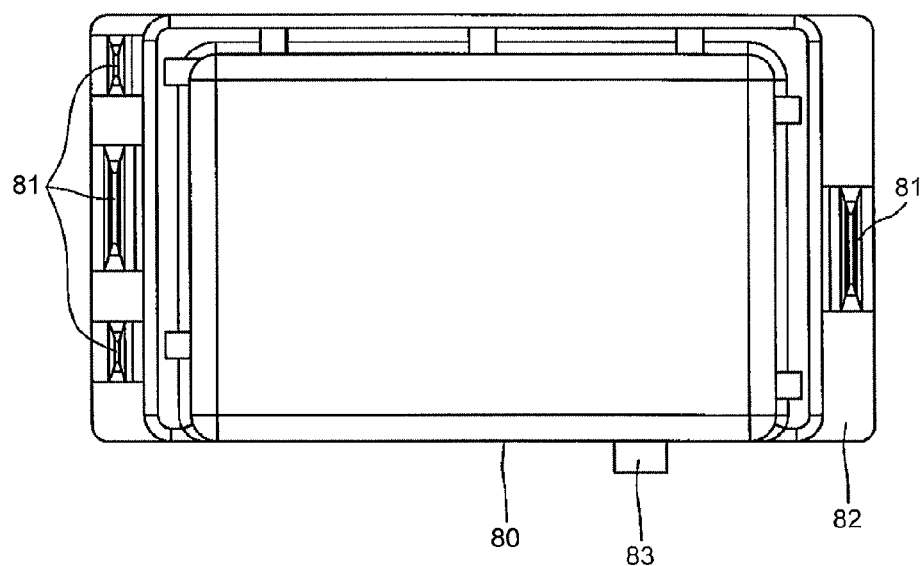
FIG. 10 is a bottom view of the relay illustrated in FIG. 9.

Each of the relay accommodating units 50 is a portion to accommodate the relay 8 illustrated in FIGS. 9 to 11. The relay 8 includes a relay body 80 with a rectangular outer shape, a plurality of terminals 81 projecting from the relay body 80, and a plate resin member 82 retaining the terminals 81 and mounted on the upper surface of the relay body 80. A locking projection 83 to be locked with a locking piece 53 (FIG. 3) of the relay accommodating unit 50 is formed on a lateral surface of the relay body 80. The terminal 81 includes a base end portion electrically connected to a conductor in the relay body 80, a middle portion bent on the surface of the resin member 82 at a right angle toward the bottom surface side of the relay body 80, and a leading end portion facing a lateral surface of the relay body 80. The relay 8 includes four terminals 81. Three out of the four terminals are arranged in a side of the relay body 80, and the remaining one terminal is arranged in the opposite side of the relay body 80.

Each of the relay accommodating unit 50 is configured with a relay body accommodating portion 51 accommodating the relay body 80, three terminal accommodating portions 52a, one terminal accommodating portion 52b, the locking piece 53 locked by the locking projection 83, and others. The terminal accommodating portion 52a accommodates the leading ends of aligned three terminals 81 and the terminal 11 connected to an end of the electrical wire 9a (FIGS. 1 and 2). The terminal accommodating portion 52b accommodates the leading end of a terminal 81 not aligning with other terminals 81, the relay terminal 12, and the relay connecting portion 133 (FIG. 1) of the second bus bar 13b.

As illustrated in FIGS. 11, 13, and 14, each of the relay terminals 12 includes a tube portion 120 for positioning the terminal 81 and the relay connecting portion 133 inside the tube portion 120 and a spring 121 for pressing against the terminal 81 and the relay connecting portion 133. The terminal 81 is inserted into the tube portion 120 through an opening formed in an end of the tube portion whereas the relay connecting portion 133 is inserted into the tube portion 120 through an opening formed in the other end of the tube portion 120. As illustrated in FIG. 2, the relay terminal 12 is accommodated in the terminal accommodating portion 52b in a state of mating with the terminal 81. Under this condition, the blocks 5 and 6 are joined to each other.

As illustrated in FIG. 2, the blocks 5 and 6 including the respective parts are horizontally joined to each other. The horizontal direction corresponds to a direction orthogonal to the stacking direction (the height direction as described earlier) of the assembled blocks 5 and 6. In the block assembly 10, with blocks 5 and 6 joined to each other, each of the relay connecting portions 133 in the block 6 is inserted into the tube portion 120 of the relay terminal 12, which electrically connects between the relay connecting portion 133 and the terminal 81 through the relay terminal 12. The blocks 5 and 6 are joined to each other to form the block assembly 10, and the block assembly 10 is installed in the frame 2.

In the block assembly 10, a power source wire and the input portion 131 are electrically connected to each other on the power source connecting unit 63, and the power source bifurcated by the first bus bar 13a passes through each fuse and is output outside the electrical connection box 1 from a plurality of electrical wires 9a and 9b. The second bus bars 13b, the relay terminals 12, and the relays 8 are interposed between the fuses and the electrical wire 9a.

As illustrated in FIG. 1, with the block assembly 10 installed in the frame 2, the relay accommodating units 50 as a portion of the block 5 are placed under the block 6 in a manner overlapping with the block 6. The electrical wire 9a electrically connected to the relays 8 is drawn horizontally from the terminal accommodating portions 52a toward the inside of the frame 2. This configuration requires no spaces for routing the electrical wire 9a under the block 5. This configuration can thus achieve effective use of the space under the block 6 as a space for installing the block 5 without increasing the height dimension of the frame 2 and reduce the size of the electrical connection box 1.

As illustrated in FIG. 1, the block 5 is placed such that the block 5 avoids the electrical wire 9b so as to prevent interference with the electrical wire 9b drawn downward from the terminal accommodating unit 62 of the block 6. In other words, the block 5 is not placed under the terminal accommodating units 62. This configuration enables the block 5 to abut a portion other than the terminal accommodating units 62 of the block 6, thereby further reducing the size of the electrical connection box 1.

With the electrical connection box 1, use of the block assembly 10 requires neither electrical wires electrically connecting between fuses in the block 6 and the relays 8 in the block 5 nor spaces for routing the wires. This configuration can thus further reduce the size of the electrical connection box 1.

While typical features of the present invention have been described in the embodiment, it should be noted that the present invention is not limited to the embodiment. Various modifications can be made without departing from the spirit of the present invention.

In the electrical connection box according to the present invention, a first block is placed in the upper side in the frame, and at least a portion of a second block is placed under the first block in a manner overlapping with the first block. This configuration achieves effective use of the space under the first block. Furthermore, in the electrical connection box, a part provided to the second block is connected to an electrical wire, and the electrical wire is drawn horizontally from the second block. This configuration requires no spaces for routing an electrical wire under the second block. Consequently, this configuration of the electrical connection box prevents an increase in the height dimension of the frame and achieves effective use of a space under the first block as a space for placing the second block. This configuration thus makes the electrical connection box space-efficient, thereby reducing the size of the electrical connection box.

In the electrical connection box, the first and the second blocks are installed in the frame in a state of being joined to each other. With this joining, parts provided to the respective blocks are electrically connected to each other. This configuration requires neither electrical wires for electrically connecting between those parts nor spaces for routing the wires, thereby further reducing the size of the electrical connection box. Furthermore, with the electrical connection box, similar advantageous effects can be obtained by horizontally joining the first and the second blocks to each other.

In the electrical connection box, a part provided to the first block is connected to an electrical wire, and the electrical wire is drawn downward from the first block. The second block is placed such that the second block avoids the electrical wire drawn from the first block. With this configuration, the second block can abut or be positioned close to the first block, which can further reduce the size of the electrical connection box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electrical connection box comprising:
a frame; and
a plurality of blocks installed in the frame, wherein
a first block is placed in an upper side in the frame, locking projections of the first block and of a second block are engaged with each other to form a block assembly, and at least a portion of the second block is placed under the first block in a manner overlapping with the first block,
a part provided to the second block is connected to a first electrical wire and the first electrical wire is drawn horizontally from the lower portion side of the second block and the drawn first electrical wire extends toward the direction in which the first electrical wire has been drawn from the second block,
a part, other than the part provided to the second block, provided to the first block is connected to a second electrical wire and the second electrical wire is drawn downward from a terminal accommodating unit of the first block, and
any terminal accommodating unit of the first block is not directly above the second block.
2. The electrical connection box according to claim 1, wherein
the first block and the second block are installed in the frame in a state of being joined to each other, and with the joining, the part provided to the second block and the part provided to the first block are electrically connected to each other.

3. The electrical connection box according to claim 2, wherein
the first block and the second block are horizontally joined to each other.

4. The electrical connection box according to claim 3, wherein
the second block abuts a portion of the first block, the portion being other than the terminal accommodating unit of the first block.

5. The electrical connection box according to claim 2, wherein
the second block abuts a portion of the first block, the portion being other than the terminal accommodating unit of the first block.

6. The electrical connection box according to claim 1, wherein
the second block abuts a portion of the first block, the portion being other than the terminal accommodating unit of the first block.

7. The electrical connection box according to claim 1, wherein
the second block longitudinally extends in a vertical direction with respect to the first block, and
the direction in which the first electrical wire extends from the second block is a horizontal direction in which the first block and the second block are engaged with each other.

8. The electrical connection box according to claim 1, wherein electrical components of the first block are configured to be electrically connected to electrical components of the second block by the engagement of the first block and the second block.

9. An electrical connection box comprising:
a frame; and
a plurality of blocks installed in the frame, wherein
a first block is placed in an upper side in the frame, the first block and a second block are engaged with each other to form a block assembly, and at least a portion of the second block is placed under the first block in a manner overlapping with the first block,
a part provided to the second block is connected to a first electrical wire and the first electrical wire is drawn horizontally from the lower portion side of the second block and the drawn first electrical wire extends toward the direction in which the first electrical wire has been drawn from the second block,
a part, other than the part provided to the second block, provided to the first block is connected to a second electrical wire and the second electrical wire is drawn downward from a terminal accommodating unit of the first block, and
any terminal accommodating unit of the first block is not directly above the second block,
wherein the second block abuts a portion of the first block, the portion being other than the terminal accommodating unit of the first block.

* * * * *